(12) United States Patent
Tokita et al.

(10) Patent No.: US 9,700,800 B2
(45) Date of Patent: Jul. 11, 2017

(54) GAME APPARATUS (71) Applicant: KABUSHIKI KAISHA SQUARE ENIX, Tokyo (JP)

(72) Inventors: Takashi Tokita, Tokyo (JP); Masayoshi Soken, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 739 days.

(21) Appl. No.: 13/688,506

(22) Filed: Nov. 29, 2012

(65) Prior Publication Data

US 2013/0184074 A1    Jul. 18, 2013

(30) Foreign Application Priority Data

Jan. 18, 2012  (JP) .................................. 2012-008136

(51) Int. Cl.
*A63F 13/52* (2014.01)
*A63F 13/53* (2014.01)
(Continued)

(52) U.S. Cl.
CPC .............. *A63F 13/77* (2014.09); *A63F 13/52* (2014.09); *A63F 13/53* (2014.09);
(Continued)

(58) Field of Classification Search
CPC .............. A63F 13/42; A63F 2300/6045; A63F 2300/5506; A63F 13/60; A63F 13/655;
(Continued)

(56) References Cited

U.S. PATENT DOCUMENTS 5,553,864 A * 9/1996 Sitrick ............................ 463/31
6,036,601 A * 3/2000 Heckel ................... G06Q 30/02
273/461

(Continued)

FOREIGN PATENT DOCUMENTS

JP    2003-125042    4/2003
JP    2006-524060    10/2006
(Continued)

OTHER PUBLICATIONS

Extended European Search Report (EESR) from European Patent Office (EPO) in European Patent Application No. 12193917.7, dated Aug. 18, 2014.

(Continued)

*Primary Examiner* — Steven J Hylinski
(74) *Attorney, Agent, or Firm* — Greenblum & Bernstein, P.L.C.

(57) ABSTRACT

A game apparatus is provided which has a convenience where another function such as photo taking by a camera can be used while playing a game by causing a game program and another application program to work together and which increases interest of the game by relating a result of execution of the application program to the contents of the game. When a camera icon displayed on a display section is selected by an operation of a touch panel, an application for controlling a camera function launches, and an image can be captured at an arbitrary timing. The captured image is converted according to a predetermined condition. The converted image is displayed on a display screen and image data is stored in a flash memory.

12 Claims, 6 Drawing Sheets

(51) Int. Cl.
*A63F 13/77* (2014.01)
*H04M 1/725* (2006.01)

(52) U.S. Cl.
CPC ... *H04M 1/72544* (2013.01); *A63F 2300/204* (2013.01); *A63F 2300/209* (2013.01); *A63F 2300/406* (2013.01); *A63F 2300/407* (2013.01); *A63F 2300/6009* (2013.01); *A63F 2300/695* (2013.01); *H04M 1/72561* (2013.01); *H04M 2250/52* (2013.01)

(58) Field of Classification Search
CPC ............ A63F 2300/6009; A63F 13/213; A63F 2300/303; A63F 2300/1087; A63F 2300/1093; A63F 13/52–13/53; A63F 2300/695; H04M 2250/52
See application file for complete search history.

(56) References Cited

U.S. PATENT DOCUMENTS

| | | | | |
|---|---|---|---|---|
| 6,283,858 | B1 * | 9/2001 | Hayes et al. | 463/31 |
| 6,285,381 | B1 * | 9/2001 | Sawano et al. | 715/726 |
| 6,435,969 | B1 * | 8/2002 | Tanaka et al. | 463/44 |
| 6,664,956 | B1 * | 12/2003 | Erdem | 345/419 |
| 6,749,514 | B1 * | 6/2004 | Moriwaki et al. | 463/43 |
| 6,811,492 | B1 * | 11/2004 | Arakawa et al. | 463/47 |
| 7,155,260 | B2 | 12/2006 | Tanaka et al. | |
| 7,313,276 | B2 | 12/2007 | Simelius et al. | |
| 7,597,622 | B2 * | 10/2009 | Takase | 463/33 |
| 7,819,731 | B2 | 10/2010 | Suzuki | |
| 7,828,656 | B2 * | 11/2010 | Paulsen | G07F 17/32 463/29 |
| 8,152,637 | B2 * | 4/2012 | Watanabe | A63F 13/10 463/11 |
| 8,202,167 | B2 * | 6/2012 | Ackley | A63F 13/10 463/31 |
| 8,231,465 | B2 * | 7/2012 | Yee | A63F 13/10 345/419 |
| 8,512,144 | B2 * | 8/2013 | Johnson et al. | 463/42 |
| 8,684,837 | B2 * | 4/2014 | Kitahara | G06T 19/006 345/619 |
| 8,747,222 | B2 * | 6/2014 | Yamashita | 463/31 |
| 9,149,715 | B2 * | 10/2015 | Abe | A63F 13/10 |
| 9,292,310 | B2 * | 3/2016 | Chaudhri | G06F 9/4443 |
| 2002/0082082 | A1 * | 6/2002 | Stamper et al. | 463/32 |
| 2003/0073466 | A1 | 4/2003 | Tanaka et al. | |
| 2003/0100363 | A1 * | 5/2003 | Ali | 463/30 |
| 2004/0127284 | A1 * | 7/2004 | Walker et al. | 463/30 |
| 2004/0268381 | A1 | 12/2004 | Simelius et al. | |
| 2005/0233769 | A1 | 10/2005 | Tanaka et al. | |
| 2006/0030371 | A1 | 2/2006 | Tanaka et al. | |
| 2006/0046817 | A1 * | 3/2006 | Paulsen et al. | 463/16 |
| 2006/0079324 | A1 * | 4/2006 | Watanabe | A63F 13/10 463/30 |
| 2006/0223635 | A1 * | 10/2006 | Rosenberg | A63F 13/10 463/37 |
| 2007/0067743 | A1 | 3/2007 | Tanaka et al. | |
| 2009/0082095 | A1 * | 3/2009 | Walker | G07F 17/32 463/25 |
| 2009/0153567 | A1 * | 6/2009 | Jung | A63F 13/10 345/473 |
| 2010/0248825 | A1 * | 9/2010 | Toyoda | A63F 13/10 463/30 |
| 2010/0255900 | A1 * | 10/2010 | Ansari | G07F 17/3244 463/25 |
| 2011/0028207 | A1 * | 2/2011 | Gagner | G07F 17/32 463/25 |
| 2011/0167383 | A1 * | 7/2011 | Schuller | G06F 9/4443 715/808 |
| 2011/0167393 | A1 | 7/2011 | Tanaka et al. | |
| 2012/0092328 | A1 * | 4/2012 | Flaks | G02B 27/017 345/419 |
| 2012/0154557 | A1 * | 6/2012 | Perez | H04N 21/25891 348/53 |
| 2012/0250943 | A1 | 10/2012 | Aomi | |

FOREIGN PATENT DOCUMENTS

| | | |
|---|---|---|
| JP | 2007-081503 | 3/2007 |
| JP | 2010-246650 | 11/2010 |

OTHER PUBLICATIONS

SmartKeitai, "FatBooth for Android", XP054975456, Retrieved from URL: http://www.youtube.com/watch?v=KsycQ53En3U, Retrieved on Jul. 17, 2014 (Mar. 16, 2011).

Anonymous, "Taking Photos Simply Android Developers", XP055128986, Retrieved from URL: http://developer.android.com/training/camera/photobasics.html, Retrieved on Jul. 15, 2014 (Jan. 4, 2012).

Anonymous, "Android—How to select a piece of an image to set the avatar—Stack Overflow", XP055129294, Retrieved from URL: http://stackoverflow.com/questions/7827819/how-to-select-a-piece-of-an-image-to-set-the-avatar, Retrieved on Jul. 16, 2014 (Oct. 19, 2011).

Lars Vogel, "Android Intents—Tutorial", XP055129177, Retrieved from URL: https://web.archive.org/web/20120116035254/http://www.vogella.de/articles/AndroidIntent/article.html, Retrieved on Jul. 15, 2014 (Jan. 16, 2012).

Office Action from Japan Patent Office (JPO) in Japanese Patent Application No. 2012-008136, dated Aug. 27, 2013.

"Tecmo Player's Mag", Tecmo Co., Ltd., vol. 026, p. 16, dated Sep. 27, 2004, together with a partial English language translation.

"Dengeki PlayStation", Media Works, Inc., vol. 283, p. 245, dated Sep. 24, 2004, together with a partial English language translation.

Office Action from Japan Patent Office (JPO) in Japanese Patent Application No. 2012-008136, dated Nov. 12, 2013, along with an English language translation thereof.

* cited by examiner

GAME APPARATUS

CROSS REFERENCE TO RELATED APPLICATION

The present disclosure relates to subject matter contained in Japanese Patent Application No. 2012-008136, filed on Jan. 18, 2012, the disclosure of which is expressly incorporated herein by reference in its entirety.

BACKGROUND OF THE INVENTION

1. Field of the Invention

The present invention relates to a game apparatus which increases interest of a game by causing a game program and another application program to work together.

2. Description of the Related Art

In recent years, smartphones that have not only a function of a normal mobile phone but also a function to connect to the Internet and play video, and portable tablet computers including a touch panel type input unit are widely used. In the smartphones and the tablet computers, application software (hereinafter referred to as "application") having various functions such as transmitting and receiving emails, connecting to the Internet, capturing sound and image by a camera, and playing a game is installed and a user can use various applications.

By the way, these applications are used individually by using their own interfaces and an application does not work together with other applications. For example, although it is proposed that image data acquired in advance is used in a game (for example, see Japanese Patent Application Laid-Open No. 2010-246650), it is not so useful because the image data needs to be acquired before starting the game by using an application that controls a camera to capture an image. Further, even if image data captured by a camera can be used in a game, the image data need not be related to the contents of the game, so that it is not so interesting.

SUMMARY OF THE INVENTION

An object of the present invention is to provide a game apparatus which has a convenience where another function such as photo taking by a camera can be used while playing a game by causing a game program and another application program to work together and which increases interest of the game by relating a result of execution of the application program to the contents of the game.

In accordance with a first aspect of the present invention, a game apparatus includes a program storage that stores a game program and another application program different from the game program; a program launcher that launches the application program stored by the program storage while the game program is being executed; a program executer that executes the application program launched by the program launcher; a data converter that converts data, which is obtained by executing the application program by the program executer, according to a predetermined condition; and a first displayer that displays an image corresponding to the data converted by the data converter on a display screen.

In the present invention, while the game is being played, another application different from the game program can be launched and used. An application used in the real life by using a smartphone or the like can also be used in the game and data obtained by the application can be converted according to the feeling of the game world, so that it is possible to give a feeling as if events in the game were actually occurring to the player.

Preferably the game apparatus in accordance with the first aspect of the invention includes a second displayer that displays an icon for launching the application program on the display screen; and an icon selection receptor that receives a selection of an icon by an operation instruction by a player, wherein the program launcher launches the application program when the selection of the icon is received by the icon selection receptor.

In the present invention, when the game program is launched, a screen similar to a standby screen (desktop screen) of a smartphone or the like is displayed and it is possible to request launch of an application that can use a camera function or connect to the Internet by a touch operation to the screen. Therefore, even in a setting in which a smartphone or the like is operated in the game, it is possible to give a feeling as if a player operated the smartphone or the like in the real world to the player, so that it is possible to add more reality to the events in the game.

In accordance with a second aspect of the present invention, a game apparatus including a camera function, the game apparatus includes a program storage that stores a game program and a camera program for controlling photographing using the camera function; a camera program launcher that launches the camera program stored by the program storage while the game program is being executed; a photographing executer that executes photographing by the camera program launched by the camera program launcher; an image data converter that converts image data, which is obtained by the photographing executer, according to a predetermined condition; and a displayer that displays an image corresponding to the image data converted by the image data converter on a display screen.

In the present invention, while the game is being played, photographing can be performed by a camera. Image data obtained by the photographing can be converted according to the feeling of the game world, so that it is possible to give a feeling as if the events in the game were actually occurring to the player. For example, in a case of a horror adventure game, even when an image in the real world is photographed by using a camera function, the obtained image is converted into horror image data, so that it is possible to increase a sense of fear felt during play of the game.

In accordance with a third aspect of the present invention, a game apparatus which can connect and communicate with a communication network, the game apparatus includes a program storage that stores a game program and a web browser; a web browser launcher that launches the web browser while the game program is being executed; a data transmit-receiver that executes the web browser launched by the web browser launcher and transmits and receives text data to and from a predetermined server connected and communicated with a computer apparatus; a text data converter that converts text data, which is obtained by the transmit-receiver, according to a predetermined condition; and a displayer that displays an image corresponding to the text data converted by the text data converter on a display screen.

In the present invention, while the game is being played, a web site can be browsed. Data transmitted from the web site can be converted according to the feeling of the game world, so that it is possible to give a feeling as if the events in the game were actually occurring to the player. For example, in a case of a horror adventure game, even when a micro-blog posting site is browsed, contents that can be browsed is converted into horror contents, so that it is possible to increase a sense of fear felt during play of the game.

In accordance with a fourth aspect of the present invention, a game program executed by a computer apparatus in which another application program different from the game program is stored, the game program causes the computer apparatus to function as a program launcher that launches the application program while the game program is being executed; a program executer that executes the application program launched by the program launcher; a data converter that converts data, which is obtained by executing the application program by the program executer, according to a predetermined condition; and a displayer that displays an image corresponding to the data converted by the data converter on a display screen.

In accordance with a fifth aspect of the present invention, a game program which is executed by a computer apparatus which includes a camera function and which stores a camera program for controlling photographing using the camera function, the game program causes the computer apparatus to function as a camera program launcher that launches the camera program while the game program is being executed; a photographing executer that executes photographing by the camera program launched by the camera program launcher; an image data converter that converts image data, which is obtained by the photographing executer, according to a predetermined condition; and a displayer that displays an image corresponding to the image data converted by the image data converter on a display screen.

In accordance with a sixth aspect of the present invention, a game program executed by a computer apparatus which can be connected and communicated with a communication network and which includes a web browser, the game program causes the computer apparatus to function as a web browser launcher that launches the web browser while the game program is being executed; a data transmit-receiver that executes the web browser launched by the web browser launcher and transmits and receives text data to and from a predetermined server connected and communicated with the computer apparatus; a text data converter that converts text data, which is obtained by the transmit-receiver, according to a predetermined condition; and a displayer that displays an image corresponding to the text data converted by the text data converter on a display screen.

DETAILED DESCRIPTION OF EMBODIMENTS

Figure 1:
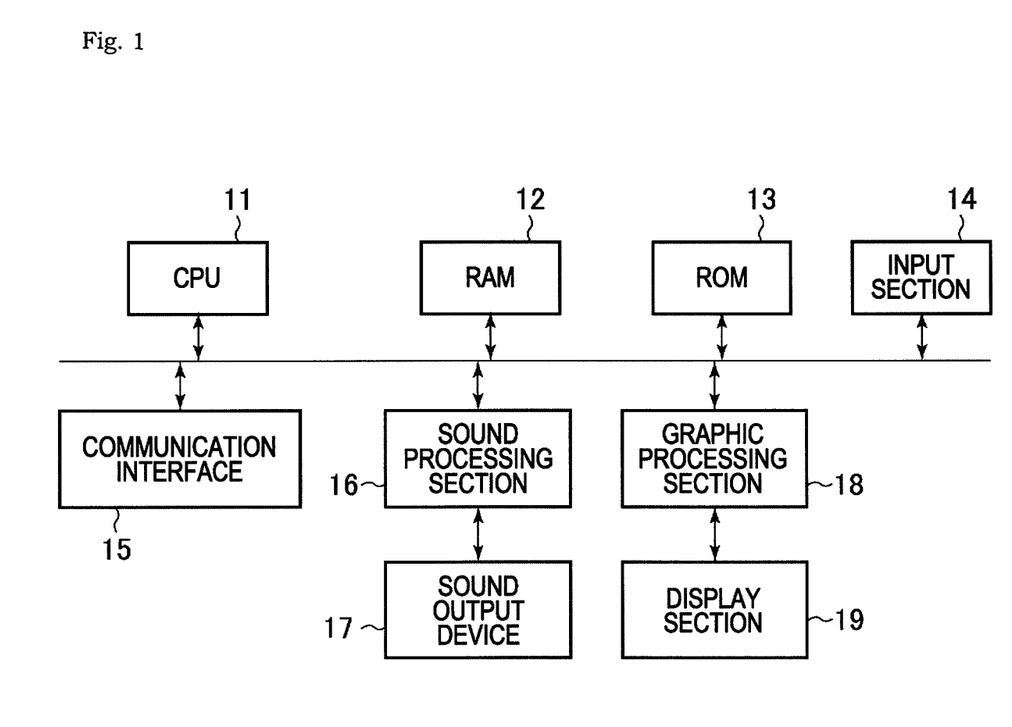
FIG. 1 is a block diagram showing a configuration of a game apparatus according to an embodiment of the present invention.

Hereinafter, an embodiment of the present invention will be described with reference to the drawings. FIG. 1 is a block diagram showing a configuration of a mobile terminal (game apparatus) applied in the embodiment. Examples of the mobile terminal of the present invention include mobile terminals such as a smartphone and a tablet type computer which are controlled by an OS (operating system). The mobile terminal includes a CPU (Central Processing Unit) 11, a RAM 12, a ROM 13, an input section 14, a communication interface 15, a sound processing section 16, a sound output device 17, a graphic processing section 18, and a display section 19.

The CPU 11 executes a program stored in the ROM 13 and controls the entire apparatus. The RAM 12 is a work area of the CPU 11. Information necessary to proceed with a game is temporarily stored in the RAM 12. The ROM 13 is used as a storage area to store programs and data. The ROM 13 includes a flash memory.

The input section 14 includes an operation button on a main body of the mobile terminal and a touch panel on the display section 19. Input information inputted from the input section 14, such as pressing the operation button or a touch operation to the touch panel by a player, is stored in the RAM 12. The CPU 11 performs various calculation processes on the basis of the input information.

The communication interface 15 can connect to a communication network by radio. The communication interface 15 can communicate with another game apparatus by radio through a communication unit including an antenna.

The CPU 11 processes a program and data loaded into the RAM 12, outputs an instruction for outputting sound to the sound processing section 16, and outputs a drawing instruction to the graphic processing section 18. The sound processing section 16 is connected to the sound output device 17, which is a speaker. When the CPU 11 outputs the instruction for outputting sound to the sound processing section 16, the sound processing section 16 outputs a sound signal to the sound output device 17.

The graphic processing section 18 is connected to the display section 19. When the drawing instruction is outputted from the CPU 11, the graphic processing section 18 outputs a video signal that displays an image on a display screen of the display section 19. One frame time of an image included in the video signal outputted from the graphic processing section 18 is, for example, 1/30 second. The graphic processing section 18 draws an image for each frame unit (for example, for each 1/30 second).

An outline of the game according to the embodiment of the present invention will be described. The game of the present invention includes a main game that is a main part of the game such as a role-playing game (RPG), an action game, and an adventure game and a mobile phone mode in which a player character operated by a player operates a mobile phone in the game.

In the main game, the game progresses while the player character moves in a virtual space to solve a problem given in the game. The player can operate the touch panel from the main game to open a menu screen and move to the mobile phone mode.

Figure 2:
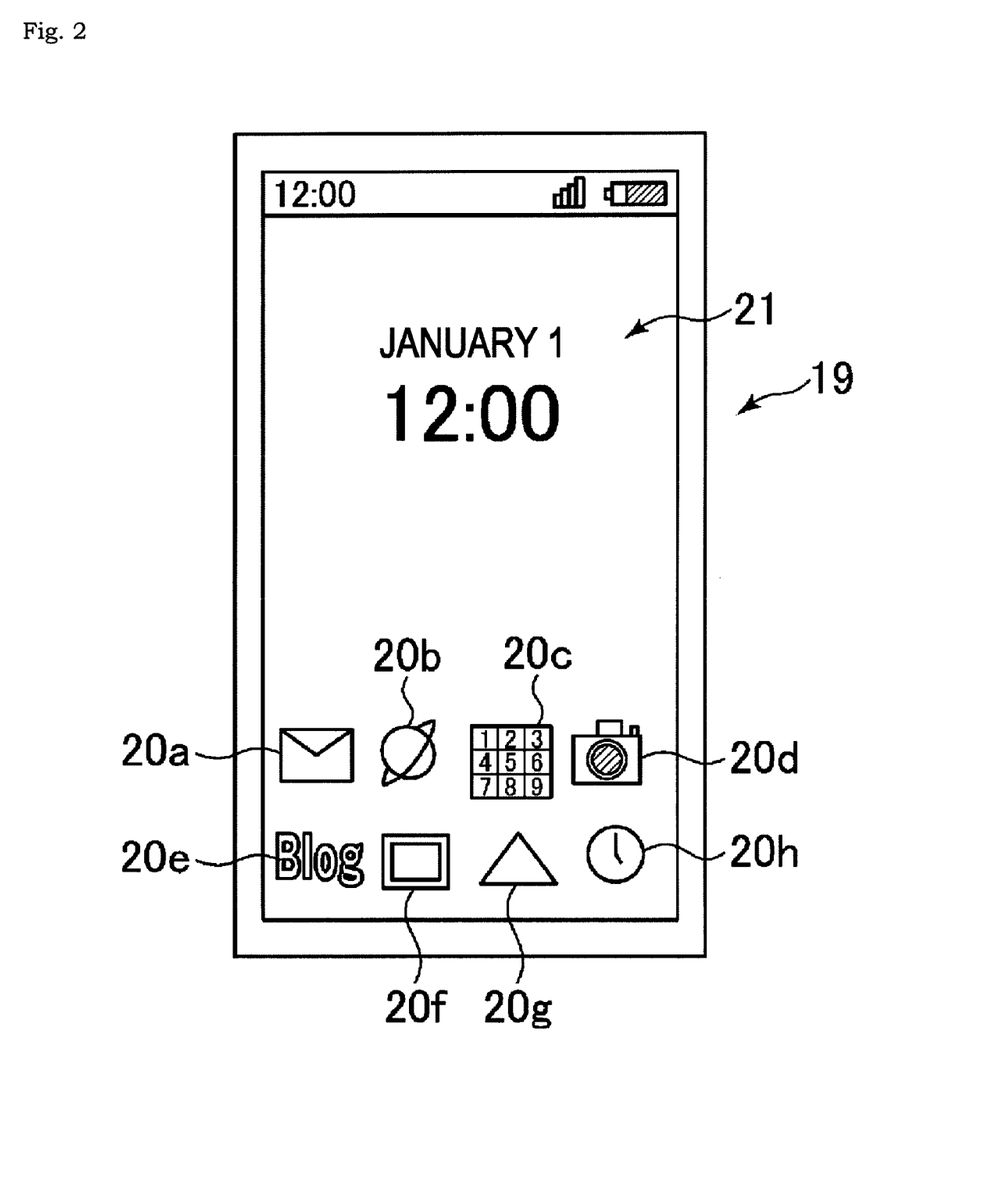
FIG. 2 is a diagram showing an example of a display screen of the game apparatus according to the embodiment of the present invention.

FIG. 2 is an example of a display screen of the game apparatus according to the embodiment of the present invention. In the mobile phone mode, a screen, which is similar to a desktop screen displayed after a smartphone or a tablet type computer is started, can be displayed as a display screen of the display section 19. Even in the game, a feeling as if being in a real world can be given to the player.

In the mobile phone mode, for example, the current date and time is correctly displayed in a date and time display area 21 at an upper middle portion of the display screen. Also, an icon 20a for launching a mailer, an icon 20b for launching a browser to connect to the Internet, an icon 20c for making a phone call, an icon 20d for capturing an image by a camera, an icon 20e for connecting to a micro-blog posting site, and the other icons 20f to 20h are displayed. It is also possible to form a configuration for actually launching a mailer or connecting to the Internet by selecting the icons 20a to 20f by a touch operation of the player to the touch panel. Also, it is possible to form a configuration in which the icons 20 are only displayed and cannot be selected and when an icon 20 is selected, a play of a mini-game whose contents are related to the icon can be started.

Figure 3:
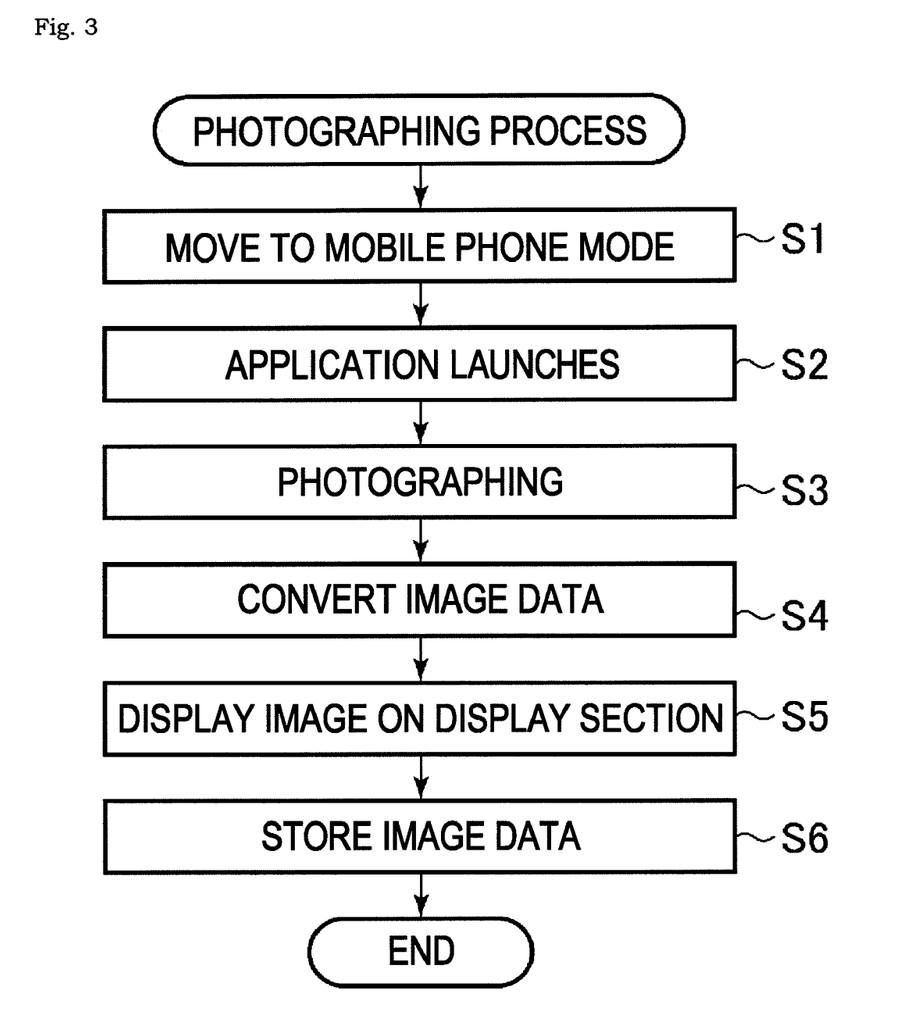
FIG. 3 is a diagram showing a flowchart of a photographing process of the game apparatus according to the embodiment of the present invention.

First, a case will be described in which an image is captured by a digital camera function in the mobile phone mode. FIG. 3 is a diagram showing a flowchart of a photographing process according to the embodiment of the present invention. First, by a touch panel operation of the player, a mode changes from the main game to the to the mobile phone mode (step S1). Next, when the player operates the touch panel to select the camera icon 20d displayed on the display screen of the display section 19, an application for controlling the camera function launches (step S2), and an image can be captured by the camera function installed in the game apparatus. On the display screen of the display section 19, circumstances of the real world captured by a photographic lens mounted in the game apparatus are displayed.

When the player presses the operation button in the input section 14 at an arbitrary timing, the circumstances of the real world are captured by an image sensor (step S3). The image data captured in step S3 is converted according to a predetermined condition (step S4). On the basis of the converted image data, a converted image is displayed on the display screen of the display section 19 (step S5) and stored in the flash memory of the ROM 13 (step S6).

The image which is converted and stored in the flash memory can be browsed by selecting an icon corresponding to an application for browsing an image in the mobile phone mode in the game or can be browsed by launching an application for normally browsing an image after completing the game.

Figure 4:
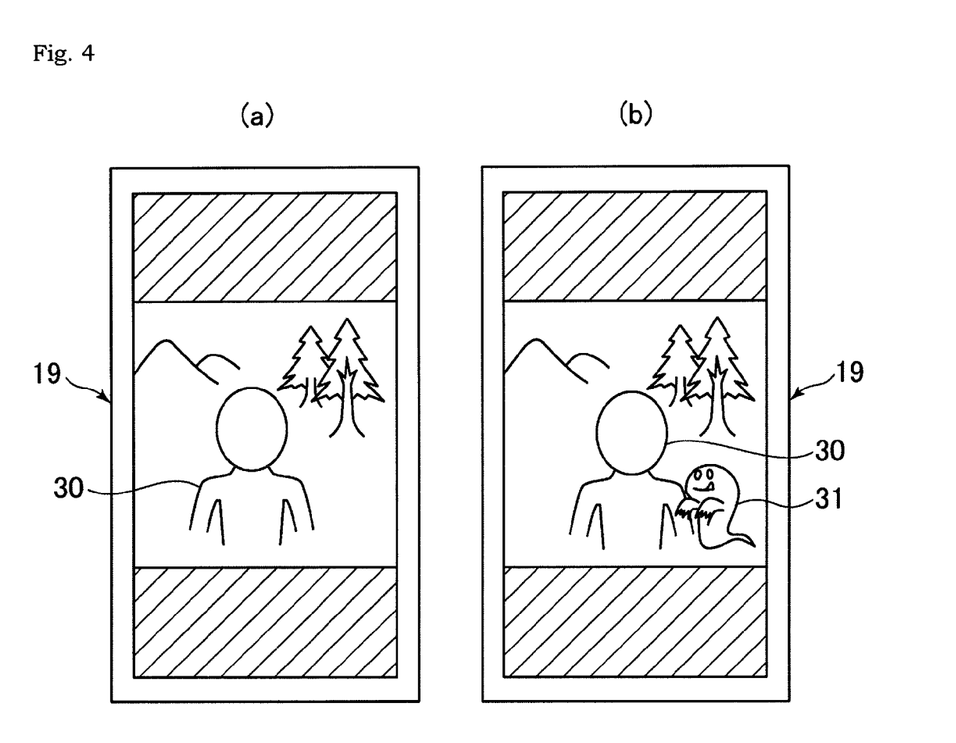
FIGS. 4a and 4b are diagrams showing an example of a display screen of the game apparatus according to the embodiment of the present invention.

Although the conversion method of the image data in step S4 is not particularly limited, for example, the conversion is performed by replacing an image data of a predetermined area by an image data of the character appearing in the game. FIGS. 4a and 4b are diagrams showing an example of the display screen of the game apparatus and show a relationship between before and after the conversion of the image data. FIG. 4a shows the image data captured in step S3, in which a player 30 is displayed in the center of the screen of the display section 19. FIG. 4b shows the image data converted in step S4, in which not only the player 30 is displayed in the center of the screen, but also a horror image 31 is displayed to the right of the player.

When the category of the game is a horror adventure game, as shown in FIG. 4b, a character including a horror factor is displayed in a part of the image. However, an image to be pasted can be appropriately adjusted according to the category of the game. In step S4, a plurality of images to be pasted may be prepared and an image to be pasted may be appropriately determined according to the progress of the game. The size and the position of the image to be pasted are arbitrarily adjusted.

In addition, examples of the image data conversion method in step S4 includes a method in which all the image data is converted from a color image to a monochrome image and a method in which an area where a face of a subject person is identified by using a face recognition system and the area is replaced by an image of a predetermined character.

Figure 5:
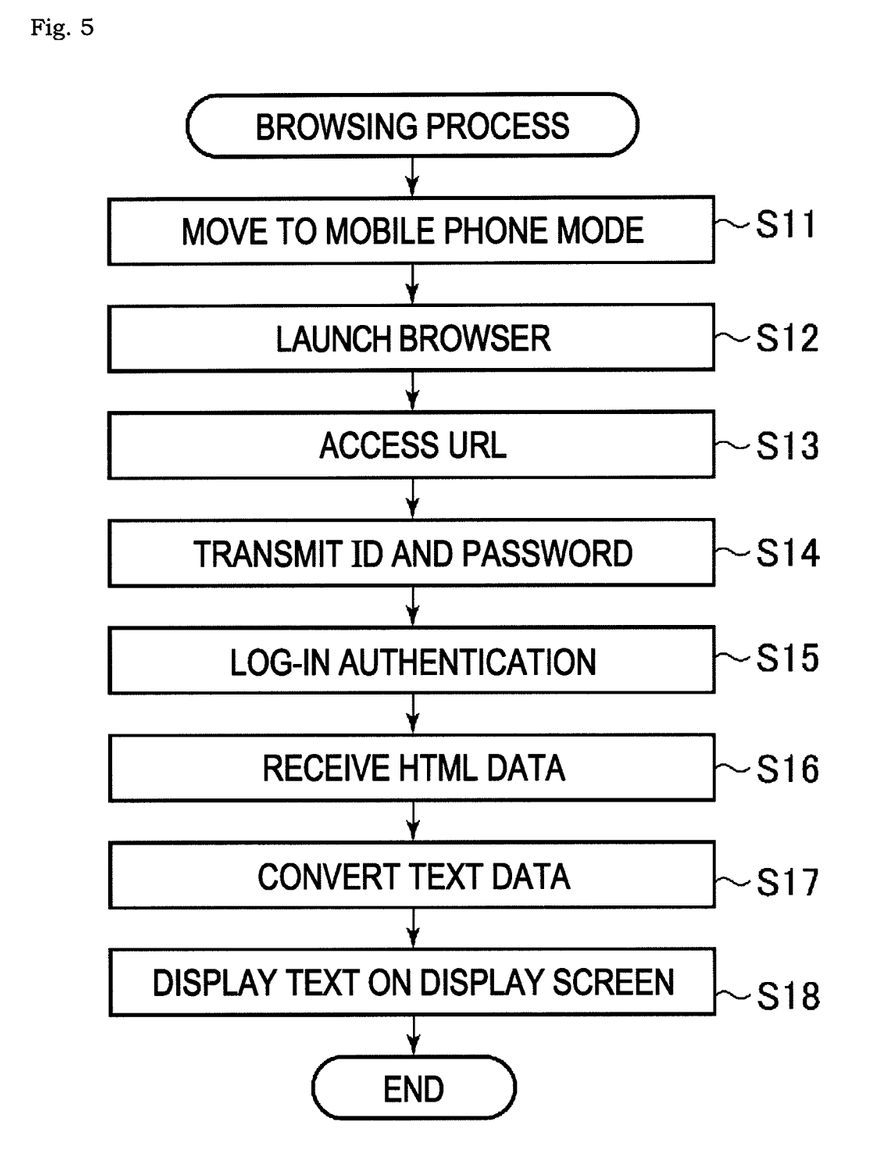
FIG. 5 is a diagram showing a flowchart of a web site browsing process of the game apparatus according to the embodiment of the present invention.

Next, a case will be described in which a web site is browsed in the mobile phone mode 200. Although there is no limitation about web sites to which the present invention can be applied, here, a case in which a micro-blog posting site is browsed will be described. FIG. 5 is a diagram showing a flowchart of a web site browsing process of the game apparatus according to the embodiment of the present invention.

First, by a touch panel operation of the player, a mode changes from the main game to the mobile phone mode (step S11). Next, when the player operates the touch panel to select a micro-blog icon 20e displayed on the display screen, a browser launches (step S12) and the browser accesses the URL of the micro-blog posting site (step S13). An ID and a password for identifying a user (player) are required to log in to the micro-blog posting site and when the ID and the password are inputted and transmitted to a web server which is a delivery source of the micro-blog posting site (step S14), the log-in is authenticated (step S15).

The type of the micro-blog posting site is not particularly limited. For example, the micro-blog posting site is a site where contents posted by a plurality of users can be browsed as a list. In the micro-blog posting site, postings of a plurality of users, which are registered in advance for a player who logs in to the micro-blog posting site to be able to browse the posted contents, are displayed in chronological order. When the log-in to the micro-blog posting site is authenticated in step S15, HTML data for displaying the micro-blog posting site is received by the game apparatus (step S16).

In the game apparatus, a part or all of text data posted by a user in the received HTML data is converted by a predetermined method (step S17) and the converted text data is displayed on the display screen (step S18). The conversion method of the text data posted by the user is not particularly limited, and for example, in a case of a horror adventure game, a method can be used in which numbers, alphabets, hiraganas, katakanas, and special symbols (-, [,], ?, !, *, punctuation marks, and the like) are not converted and the other characters are converted into " . . . ". For example, when "It is a fine day today!" is posted from the user, " . . . is a . . . !" is displayed, so that the player cannot understand the posted content, and thus it is possible to cause a sense of fear.

In the conversion of the text data in step S17, it is not necessary to convert all the postings displayed in the micro-blog posting site and only a part of the posted content may be converted. For example, the number of postings to be converted may vary according to the progress of the main game. In a scene when a sense of fear is heightened in the main game, if the number of the postings to be converted at the timing of the scene is increased, the sense of fear can be further heightened.

Figure 6:
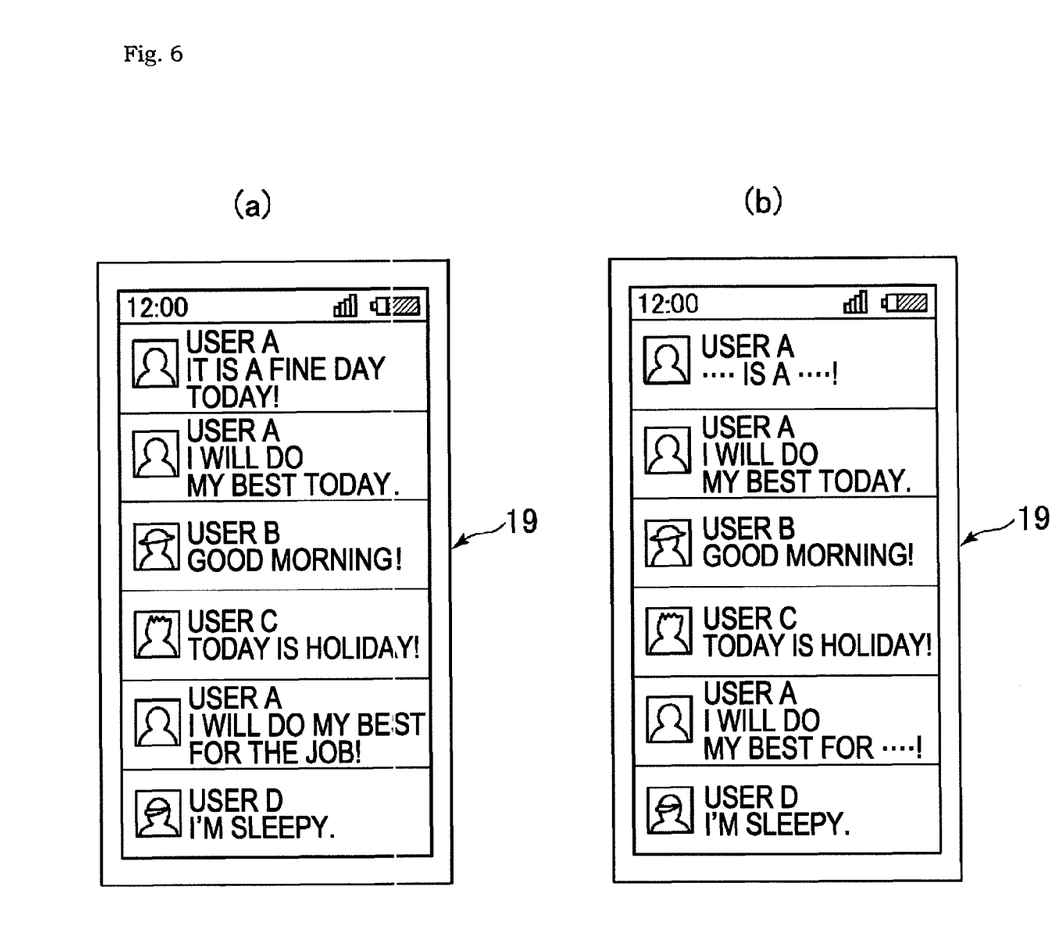
FIGS. 6a and 6b are diagrams showing an example of a display screen of the game apparatus according to the embodiment of the present invention.

FIGS. 6a and 6b are diagrams showing an example of the display screen of the game apparatus and also diagrams showing an example when the micro-blog posting site is browsed. FIG. 6a shows an appearance of the micro-blog posting site when the text data is not changed. FIG. 6b shows an appearance of the micro-blog posting site after the text data is changed. In FIG. 6b, the postings of a user A, which are displayed in the first and the fifth fields from the above, are changed and displayed.

In the above embodiment, a case is described in which the present invention is applied to a horror adventure game. However, the category of the game to which the present invention is applied is not limited. For example, the present invention can be applied to a normal action game, a shooting game, a RPG, a fighting game, a sports game, and the like. The image data and the text data are changed so that the feeling of each game world is reflected.

REFERENCE SIGNS LIST

11 CPU
12 RAM
13 ROM
14 INPUT SECTION
15 COMMUNICATION INTERFACE
16 SOUND PROCESSING SECTION
17 SOUND OUTPUT DEVICE
18 GRAPHIC PROCESSING SECTION
19 DISPLAY SECTION
20 ICON
30 PLAYER
31 HORROR IMAGE

What is claimed is:

1. A game apparatus, comprising:
a memory that stores a game program and another application program different from the game program;
a program launcher that launches the application program stored by the memory while the game program is being executed;
a central processor that executes the application program launched by the program launcher, the application program obtaining data comprising an image, the data of the application program being converted according to a predetermined condition, the data being converted by replacing image data within the image of the application program with image data of the game program; and
a graphics processor that displays the image of the application program, including the converted data, on a display screen,
wherein the image data within the image of the application program is converted according to at least one of a category of the game program and a progress of the game program.

2. The game apparatus according to claim 1, wherein
the graphics processor displays an icon for launching the application program on the display screen,
the game apparatus further comprises an input that receives a selection of the icon by an operation instruction by a player, and
the program launcher launches the application program when the selection of the icon is received by the input.

3. The game apparatus according to claim 1, wherein
the data of the application program which is converted according to the predetermined condition includes less than all image data of the image of the application program.

4. The game apparatus according to claim 3, wherein
the data of the application program which is converted according to the predetermined condition includes a face of a subject person identified by using face recognition.

5. The game apparatus according to claim 4, wherein
the face of the subject person is replaced by an image of a predetermined character of the game program.

6. The game apparatus according to claim 1, wherein
the data of the application program which is converted according to the predetermined condition includes all image data of the image of the application program.

7. The game apparatus according to claim 6, wherein
all the image data of the image of the application program which is converted according to the predetermined includes converting the image data from a color image to a monochrome image.

8. The game apparatus according to claim 1, wherein
a number of images to be converted varies according to a progress of the game program.

9. The game apparatus according to claim 1, wherein
the application program controls a camera function of the game apparatus.

10. The game apparatus according to claim 9, further comprising:
a photographic lens which captures the image of the application program.

11. The game apparatus according to claim 1, wherein
the game program includes a display screen configured to represent a smartphone display, the display screen including a current date, a current time, a browser icon, a mail icon, and an icon for launching the application program.

12. A non-transitory computer-readable medium including a game program executed by a computer apparatus in which another application program different from the game program is stored, the game program causing the computer apparatus to execute:
launching the application program while the game program is being executed;
executing, by a processor, the application program launched by the launching;
obtaining, by the application program, data comprising an image;
converting the data which is obtained by the application program, according to a predetermined condition, the data being converted by replacing image data within the image of the application program with image data of the game program; and
displaying, by a graphics processor, the image of the application program, including the converted data, on a display screen,
wherein the image data within the image of the application program is converted according to at least one of a category of the game program and a progress of the game program.

* * * * *